(12) United States Patent
Maute (10) Patent No.: US 6,779,407 B2
(45) Date of Patent: Aug. 24, 2004

(54) FLUID FLOW MEASURING DEVICE AND METHOD OF MANUFACTURING THEREOF

(75) Inventor: Robert E. Maute, Richardson, TX (US)

(73) Assignee: REM Scientific Enterprises, Inc., Richardson, TX (US)

(*) Notice: Subject to any disclaimer, the term of this patent is extended or adjusted under 35 U.S.C. 154(b) by 0 days.

(21) Appl. No.: 10/600,053

(22) Filed: Jun. 20, 2003

(65) Prior Publication Data

US 2004/0083804 A1 May 6, 2004

Related U.S. Application Data

(62) Division of application No. 09/880,402, filed on Jun. 13, 2001.

(51) Int. Cl.$^7$ ................................................. G01F 1/86

(52) U.S. Cl. ................................. 73/861.12; 73/861.15

(58) Field of Search ........................ 73/861.11, 861.12, 73/861.13, 861.15, 861.16, 861.17

(56) References Cited

U.S. PATENT DOCUMENTS

| | | | |
|---|---|---|---|
| 3,076,334 A | | 2/1963 | Wiley |
| 3,530,713 A | * | 9/1970 | Nazareth, Jr. ............ 73/861.12 |
| RE28,989 E | | 10/1976 | Cushing |
| 4,228,350 A | | 10/1980 | Paap et al. |
| 4,953,408 A | * | 9/1990 | Appel et al. ............. 73/861.16 |
| 4,969,363 A | | 11/1990 | Mochizuki |
| 5,251,479 A | | 10/1993 | Siegfried, II et al. |
| 5,297,425 A | | 3/1994 | Hamby et al. |
| 5,388,455 A | | 2/1995 | Hamby et al. |
| 5,448,920 A | * | 9/1995 | Ketelsen et al. ......... 73/861.12 |
| 5,551,287 A | | 9/1996 | Maute et al. |
| 6,173,793 B1 | | 1/2001 | Thompson et al. |
| 6,431,011 B1 | | 8/2002 | Feller |

FOREIGN PATENT DOCUMENTS

| | | |
|---|---|---|
| GB | 811 347 A | 4/1959 |
| GB | 2 064 130 A | 6/1981 |
| WO | WO 01/111190 A1 | 2/2001 |

OTHER PUBLICATIONS

Baker, R.C., "A Review of Some Applications of Electromagnetic Flow Measurement," Symposium on Flow: Its Measurement and Control in Science and Industry, vol. 1, Part 2, Flow Measuring Devices, 1971, pp. 745–753.

Flood, J. "Single–Sensor Measurement of Flow in Filled or Partially Filled Process Pipes," Sensors Magazine, Sep. 1997.

Doney, B., "EMF Flow Measurement in Partially Filled Pipes," Sensors, Oct. 1999, pp. 65–68.

Maute, B., "Practical Interpretation of Production Logs," Version 9.0, Customized for the China National Oil and Gas Exploration & Development Corporation, Earth Resource and Environment Center, The University of Texas at Arlington, Dec. 17–19, 1997, pp. 1–160.

(List continued on next page.)

Primary Examiner—Robert Raevis
(74) Attorney, Agent, or Firm—Slater & Matsil, L.L.P.

(57) ABSTRACT

In a borehole logging tool, the flow of conductive fluid into or out of a wellbore at the wellbore wall is detected and measured with a sensor loop proximate the borehole inner wall. The sensor loop includes a series of contiguous sensors that act as electromagnetic flowmeters and provide fluid measurements covering the entire circumference of the sensor loop. The sensor loop includes an elastic element that forces the sensor loop outward to maintain pressure along the sensor loop circumference against the interior borehole wall. The sensor loop is designed to lie at a non-perpendicular angle to the wellbore axis, and mechanical arms press the top and bottom of the loop against the borehole inner wall.

33 Claims, 9 Drawing Sheets

OTHER PUBLICATIONS

International Search Report for Corresponding International Application No. PCT/US 02/16895, dated Sep. 24, 2002.

Maute, R.E., "A Guide to Diagnosing Your Wells: Production Logging," Probe Technology Services, Inc., 2000.

Hill, A.D., et al., "Production Logging Tool Behavior in Two–Phase Inclined Flow," 56$^{th}$ Annual Fall Technical Conference and Exhibition of the Society of Petroleum Engineers of AIME, San Antonio, TX, Oct. 5–7, 1981.

Branagan, P., et al., "Tests Show Production Logging Problems in Horizontal Gas Wells," Oil & Gas Journal, Jan. 10, 1994, pp. 41–45.

Kelman, J.S., "Biphasic Fluid Studies for Production Logging in Large–Diameter Devitated Walls [sic]," The Log Analyst, Nov.–Dec. 1993, pp. 6–10.

Ding, Z.H., et al., "A Comparison of Predictive Oil/Water Holdup Models for Production Log Interprettion in Vertical and Deviated Wellbores," SPWLA 35$^{th}$ Annual Logging Symposium, Jun. 19–22, 1994, pp. 1–18.

Nice, S.B., "Production Logging in Horizontal Wellbores," 5$^{th}$ World Oil et al. Horizontal Well Technology Int. Conference (Houston) Proc., sect 11, Nov. 1993.

Zhu, D., et al., "The Effect of Flow from Perforations on Two–Phase Flow: Implications for Production Logging," 63$^{rd}$ Annual Techinical Conference and Exhibiton of the Society of Petroleum Engineers, Houston, TX, Oct. 2–5, 1988, pp. 267–275.

Molz, F.J., et al, "Development and Application of Borehole Flowmeters for Environmental Assessment," The Log Analyst, Jan.–Feb. 1993, pp. 13–23.

Ross, G., "The Electromagnetic Flowmeter as Applied to the Measurement of Blood Flow in Living Systems," Symposium on Flow: Its Measurement and Control in Science and Industry, vol. 1, Pittsburgh, PA, 1971, pp. 1337–1345.

Cushing, V.J., "Electromagnetic Water Current Meter," Water Resources Instrumentation, vol. 1 Measuring and Sensing Methods, Processings of the International Seminar and Exposition on Water Resources instrumentation Jun. 4–6, 1974, Chicago, IL, pp. 35–55.

Razi, M., et al., "Characterizing Flow through a Perforation Using Ultrasonic Doppler," Production Operations Symposium, Oklahoma City, OK, Apr. 2–4, 1995, pp. 943–953.

* cited by examiner

FLUID FLOW MEASURING DEVICE AND METHOD OF MANUFACTURING THEREOF

This application is a divisional of U.S. application Ser. No. 09/880,402, filed Jun. 13, 2001, entitled "Conductive fluid Logging Sensor and Method," which application is hereby incorporated herein by reference.

TECHNICAL FIELD

This invention relates generally to oil and gas well production logging sensors and methods, and more particularly to a sensing device and method for detecting fluid influx into a well.

BACKGROUND

Figure 1:
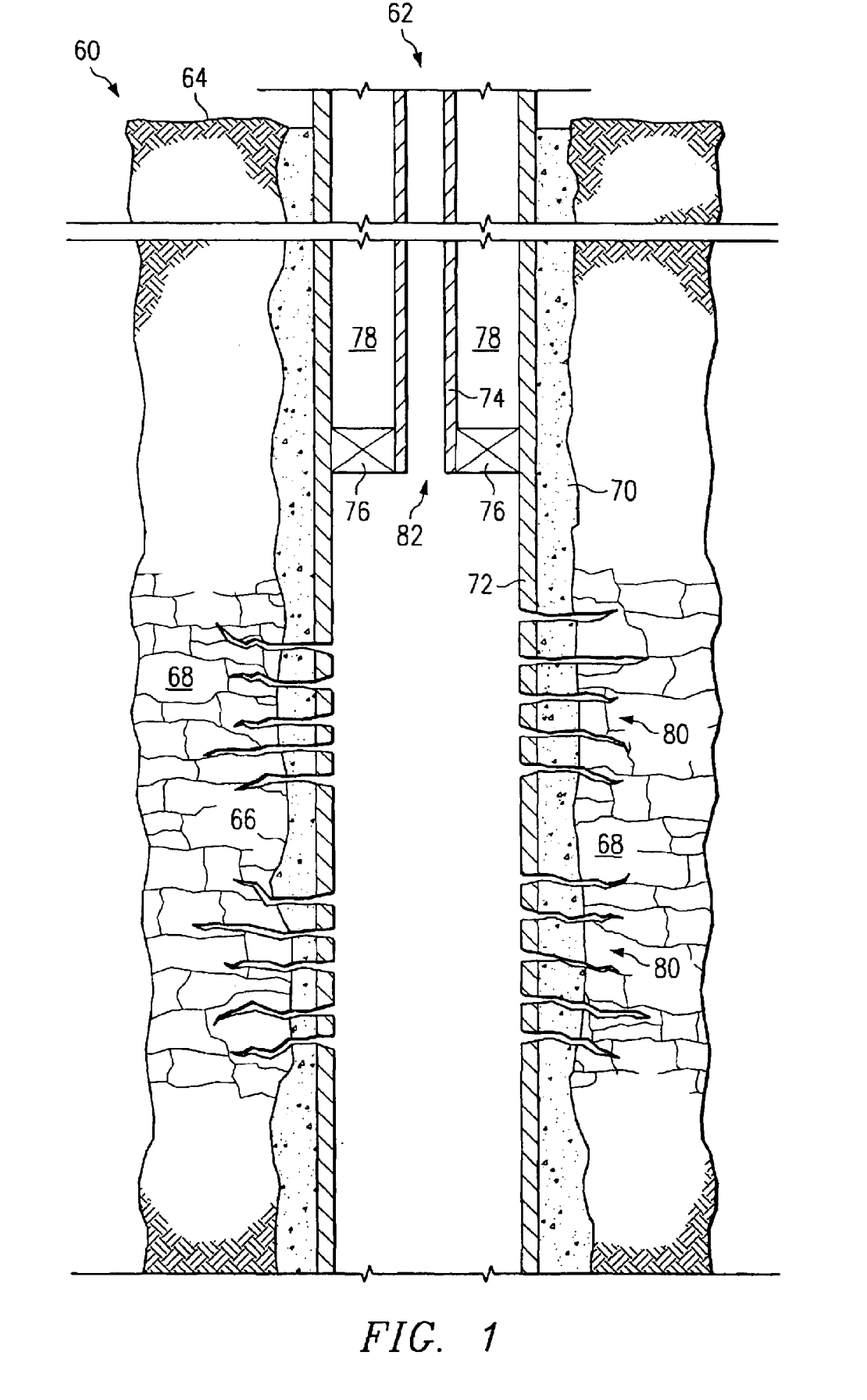
FIG. 1 shows an oil or gas well.

An oil and gas well is shown in FIG. 1 generally at 60. Well construction involves drilling a hole or borehole 62 in the surface 64 of land or ocean floor. The borehole 62 may be several thousand feet deep, and drilling is continued until the desired depth is reached. Fluids such as oil, gas and water reside in porous rock formations 68. A casing 72 is normally lowered into the borehole 62. The region between the casing 72 and rock formation 68 is filled with cement 70 to provide a hydraulic seal. Usually, tubing 74 is inserted into the hole 62, the tubing 74 including a packer 76 which comprises a seal. A packer fluid 78 is disposed between the casing 72 and tubing 74 annular region. Perforations 80 may be located in the casing 72 and cement 70, into the rock 68, as shown.

Production logging involves obtaining logging information about an active oil, gas or water-injection well while the well is flowing. A logging tool instrument package comprising sensors is lowered into a well, the well is flowed and measurements are taken. Production logging is generally considered the best method of determining actual downhole flow. A well log, a collection of data from measurements made in a well, is generated and is usually presented in a long strip chart paper format that may be in a format specified by the American Petroleum Institute (API), for example.

The general objective of production logging is to provide information for the diagnosis of a well. A wide variety of information is obtainable by production logging, including determining water entry location, flow profile, off depth perforations, gas influx locations, oil influx locations, non-performing perforations, thief zone stealing production, casing leaks, crossflow, flow behind casing, verification of new well flow integrity, and floodwater breakthrough, as examples. The benefits of production logging include increased hydrocarbon production, decreased water production, detection of mechanical problems and well damage, identification of unproductive intervals for remedial action, testing reservoir models, evaluation of drilling or completion effectiveness, monitoring Enhanced Oil Recovery (EOR) process, and increased profits, for example. An expert generally performs interpretation of the logging results.

In current practice, measurements are typically made in the central portion of the wellbore cross-section, such as of spinner rotation rate, fluid density and dielectric constant of the fluid mixture. These data may be interpreted in an attempt to determine the flow rate at any point along the borehole. Influx or exit rate over any interval is then determined by subtracting the flow rates at the two ends of the interval.

In most producing oil and gas wells, the wellbore itself generally contains a large volume percentage or fraction of water, but often little of this water flows to the surface. The water that does flow to the surface enters the wellbore, which usually already contains a large amount of water. The presence of water already in the wellbore, however, makes detection of the additional water entering the wellbore difficult and often beyond the ability of conventional production logging tools.

Furthermore, in deviated and horizontal wells with multiphase flow, and also in some vertical wells, conventional production logging methods are frequently misleading due to complex and varying flow regimes or patterns that cause misleading and non-representative readings. Generally, prior art production logging is performed in these complex flow regimes in the central area of the borehole and yields frequently misleading results, or may possess other severe limitations. Often the location of an influx of water, which is usually the information desired from production logging, is not discernable due to the small change in current measurement responses superimposed upon large variations caused by the multiphase flow conditions.

The problems of production logging in multi-phase flow in conventional production logging are well known and described in the literature. Hill, A. D., et al., in an article entitled, "Production Logging Tool Behavior in Two-Phase Inclined Flow", JPT, October 1982, pp. 2432–2440, describe the problems of conventional production logging in multiphase wells, stating that for production logging purposes, a well is deviated if it has a deviation over two degrees. Virtually all producing wells have deviations of at least two degrees, and thus virtually all wells are subject to difficult multiphase flow conditions for production logging. Hill et al. also describe the four main types of measurements in use in conventional production logging practice, which are the spinner, dielectric constant, fluid density, and concentrating flowmeters.

A more extensive description of conventional production logging measurements and the problems encountered in multiphase flow is found in a monograph entitled "Production Logging—Theoretical and Interpretative Elements", by Hill, A. D., Society of Petroleum Engineers, Monograph Volume 14, Richardson, Tex., 1990. In addition, the following publications discuss the problems of measuring multiphase flow in deviated or horizontal wells: "Tests Show Production Logging Problems in Horizontal Gas Wells" by Branagan, P., et al., Oil & Gas Journal, Jan. 10, 1994, pp. 41–45; "Biphasic Fluid Studies for Production Logging in Large-Diameter Deviated Wells" by Kelman, J. S., November–December 1993, The Log Analyst, pp. 6–10; "A Comparison of Predictive Oil/Water Holdup Models for Production Log Interpretation in Vertical and Deviated Wellbores" by Ding, Z. X., et al, SPWLA 35th Annual Logging Symposium Transactions, June 1994, paper KK; and "Production Logging in Horizontal Wellbores" by Nice, S. B., 5th World Oil. Horizontal Well Technol. Int. Conf. (Houston) Proc., sect. 11, November 1993.

While very few wells are actually vertical, the following publication illustrates that conventional production logging may be misleading even in truly vertical wells: "The Effect of Flow From Perforations on Two-Phase Flow: Implications for Production Logging" by Zhu, D., et al., Proceedings SPE Annual Technical Conference and Exhibition, SPE 18207, October 1988, p. 267–75.

U.S. Pat. No. 5,551,287 entitled, "Method of Monitoring Fluids Entering a Wellbore", issued Sep. 3, 1996 to Maute et al. addresses the above problems. However, the invention has limitations in that it is mechanically complex, and is sensitive in different ways to all three fluids encountered downhole (water, gas, and oil), which results in complex log interpretation, and possibly misleading log interpretation. For example, the interpretation may be misleading if gas does not cool upon entry to the wellbore, as it usually but not always does. The interpretation is also complicated when the wellbore contains a significant amount of non-produced water as is generally the case, making the distinguishing of inflow of water from non-produced water difficult and ambiguous. In addition, the tool is designed for only one casing diameter, and cannot readily accommodate any significantly different diameter, as does occur in many wells. Furthermore, a large amount of data is needed from each of the multitude of pads (eight or more), each of which has three different sensors.

SUMMARY OF THE INVENTION

The present invention provides an apparatus for and a method of measuring the flow of fluid as it enters or exits a wellbore before it becomes substantially intermixed with the fluids and the often complex flow pattern already in the wellbore.

In accordance with a preferred embodiment, a logging device utilizes a sensor loop comprising a plurality of electrodes to sense the flow of water in a wellbore. The sensor loop may include a spring for exerting continuous pressure against the wellbore wall and includes at least one current coil adapted to generate a magnetic field. By measuring the voltage induced by the magnetic field and conductive fluid (e.g., water) movement within the wellbore perpendicular to the magnetic field, the lateral flow rate of the water can be determined. The logging device may include at least two arms adapted to maintain the sensor loop force against the wellbore wall while moving up and down within the wellbore, even with varying borehole diameters.

Disclosed is a preferred embodiment of a logging tool for a borehole, the borehole having an interior wall, the tool comprising a tool body adapted to be inserted into the borehole, and a radial sensing device coupled to the tool body, the radial sensing device adapted to measure the flow velocity of conductive fluid entering or leaving the borehole interior wall, the radial sensing device being adapted to make the conductive fluid flow velocity measurements proximate the borehole wall.

Also disclosed is a preferred embodiment of a fluid flow measuring device, comprising a plurality of resistors disposed in a loop pattern, a plurality of electrodes, each electrode coupled between two adjacent resistors, a first coil of wire adapted to generate a magnetic field wound proximate the resistors and electrodes, a second coil of wire adapted to generate a magnetic field wound proximate the resistors and electrodes, and a voltage measuring mechanism electrically coupled between two of the resistors, wherein a flow of conductive fluid is detectable by measuring the voltage.

Further disclosed is a preferred embodiment of a method of measuring lateral fluid flow into a borehole, comprising traversing the borehole with a tool body having a sensor loop attached thereto, wherein the sensor loop is adapted to directly measure the flow velocity of conductive fluid entering or leaving the borehole interior wall.

Advantages of preferred embodiments of the invention include providing a logging device that is sensitive only to conductive fluids such as water, and not sensitive to non-conductive fluids such as oil or gas. Only water entering or exiting the wellbore is sensed as it enters or exits, and the sensor loop is not sensitive to water already in the borehole, whether the water is moving or not. The device is not sensitive to the complex flow regimes in the center of the wellbore, because preferred embodiments of the invention measure the flow as it enters the wellbore along the wall and before it enters into the complex flow regimes in the wellbore center. Inferring the cause of changes in above and below readings is not required as in the prior art; rather, the novel logging device directly senses water entering or leaving the wellbore. Also, the device is not required to infer the type of fluid entering the borehole, as preferred embodiments of the invention are sensitive only to conductive fluids. The measurement sensor loop has no moving parts, as in some prior art logging instruments that comprise spinners, for example. The sensor loop has no threshold fluid velocity below which the measurement registers no flow; thus the sensor loop will sense even a small fluid flow. Preferred embodiments of the present invention provide a direct measurement of the information that must generally be inferred by production engineers, that is, where water is entering the borehole.

BRIEF DESCRIPTION OF THE DRAWINGS

The above features of preferred embodiments of the present invention will be more clearly understood from consideration of the following descriptions in connection with accompanying drawings in which.

Corresponding numerals and symbols in the different figures refer to corresponding parts unless otherwise indicated. The figures are drawn to clearly illustrate the relevant aspects of the preferred embodiments, and are not necessarily drawn to scale.

DETAILED DESCRIPTION OF PREFERRED EMBODIMENTS

There are many disadvantages in prior art methods and tools for detecting water flow. For example, prior art devices and techniques are sensitive to all fluids, including water, oil and gas, which leads to ambiguity in the determination of what fluid is involved. Fluid entry or exit must be inferred from the wellbore from measurements made in the center of the borehole in complex and changing flow regimes above and below the point of interest, and the assumption that any change is due to inflow or outflow must be made. Prior art methods do not directly sense water entering or leaving the wellbore, and are sensitive to water already in borehole, whether the water is moving or not. The determination of which type of fluid, water, oil or gas, is entering or exiting the borehole must be inferred by looking at changes in measurements made above and below the entry or exit and inferring which type of fluid made the changes. The measurements are made in the center of the borehole in complex and changing flow regimes, which results in ambiguity of interpretation.

In prior art designs, the measurement device typically has moving parts, such as a spinner, which is also called the flowmeter. These moving parts may become jammed with debris in the wellbore flow stream and become useless at times. A spinner is sensitive to moving water already in borehole, and has a threshold fluid velocity below which the spinner registers no flow, even though a small flow is present. Prior art measurement tools do not directly measure where water is entering the borehole.

Preferred embodiments of the present invention eliminate these problems in the prior art by directly measuring water inflow or outflow through the borehole or casing wall. Preferred embodiments of the present invention may provide the depths and rates of water inflow or outflow. Almost all inflow or outflow is one phase, and so the flow is measured before it can combine into complex flow patterns with other phases. Preferred embodiments of the present invention are thus insensitive to the complex multiphase flow patterns found inside the wellbore. Preferred embodiments of the present invention also are sensitive to only lateral water flow into or out of the wellbore, and are not sensitive to water flow up or down inside the wellbore. Preferred embodiments of the invention may also accommodate changes in the wellbore inner diameter. Preferred embodiments of the invention are insensitive to the flow of oil or gas, allowing certain determination of the inflow or outflow of water, which is usually the information desired to be obtained from production logging.

Figure 2:
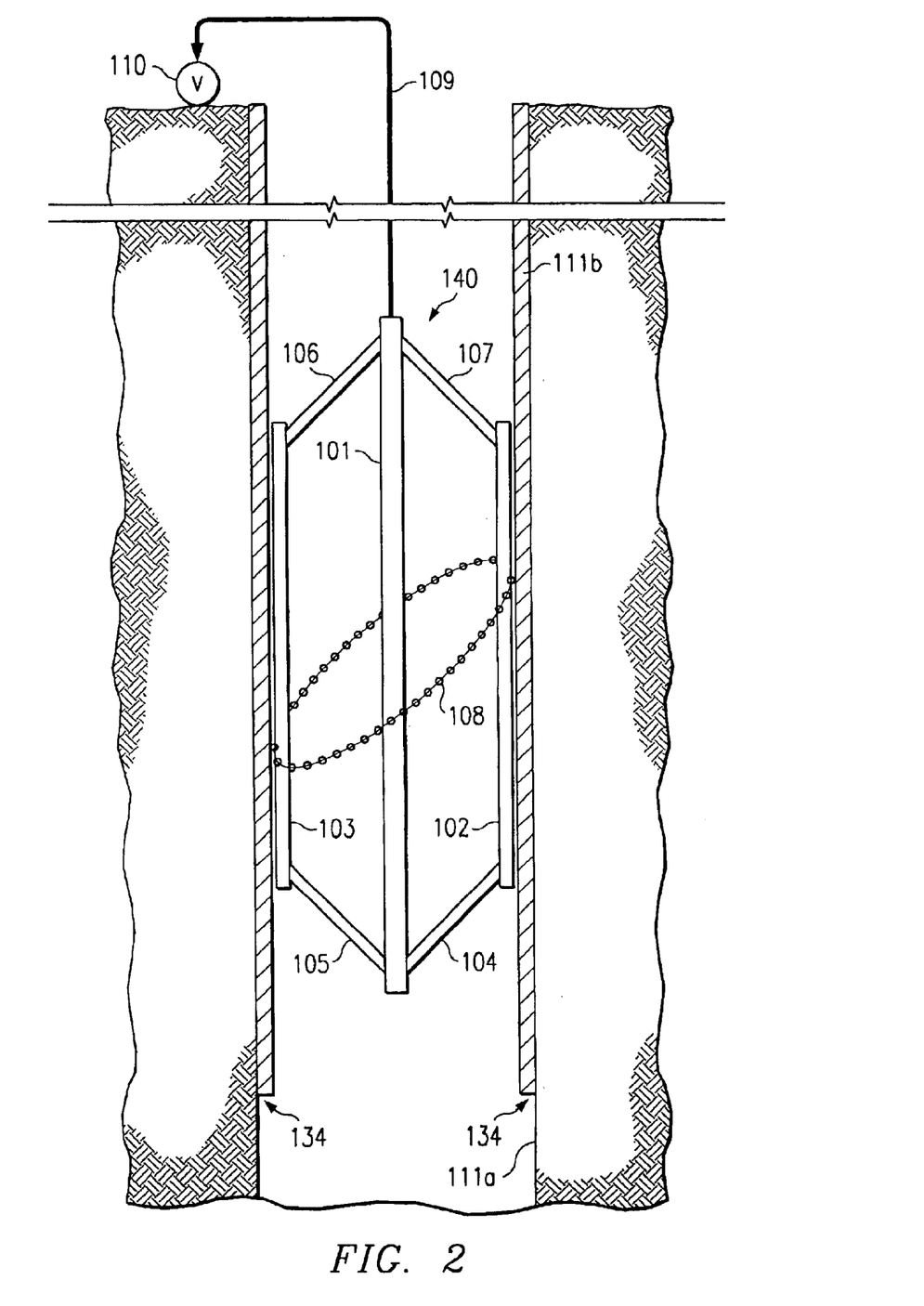
FIG. 2 illustrates a cross-sectional view of a wellbore with the sensor loop of a preferred embodiment of the present invention positioned within the wellbore.

Preferred embodiments of the present invention will next be described with reference to FIGS. 2 through 11. Referring first to FIG. 2, a logging tool 140 includes a main tool body 101 and two centralizing side arms 102 and 103. The tool body 101 preferably comprises steel and may alternatively comprise titanium, as examples. The tool body 101 may be 8 feet long and 1 inch wide, for example. The side arms 102/103 preferably comprise steel and may alternatively comprise titanium, as examples. The side arms 102/103 may be 5 feet long and ½ inch wide, for example. The side arms 102 and 103 are forced against the wellbore 111*a* or casing 111*b* by force arms 104, 105, 106, and 107. Force arms 104/105/106/107 preferably comprise spring stainless steel, as an example. The force arms 104/105/106/107 may be 1 feet long and ⅛ inch wide, for example. The wellbore 111*a* is also referred to interchangeably herein as a borehole. Typically, a wellbore 111*a* is lined with a casing 111*b* for the entire well. Embodiments of the present invention may be utilized in either a cased wellbore or in an openhole wellbore with no casing, for example.

In accordance with a preferred embodiment of the present invention, a radial sensing device 108 preferably comprising a sensor loop may be attached at radial sensing device 108 upper and lower ends to the two side arms 102 and 103. An electrical line or slickline 109 may be coupled to the logging tool 140 and may be adapted to transport the logging tool 140 to and from the surface. The electrical line 109 may transmit electrical power down to the logging tool 140 and may transmit the measured voltage to a voltage measuring and recording device 110 on the land surface. Note that the measuring and recording device 110 may alternatively reside within the logging tool body 101 as a memory device, and the tool 140 may be operated with an internal electrical power source, such as batteries.

Figure 2A:
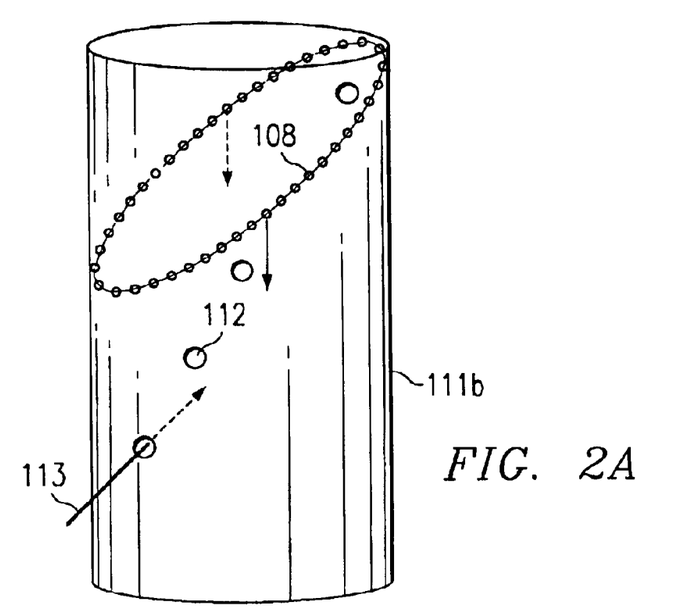
FIG. 2A shows a perspective view of the sensor loop moving downhole towards a water inflow.
Figure 2B:
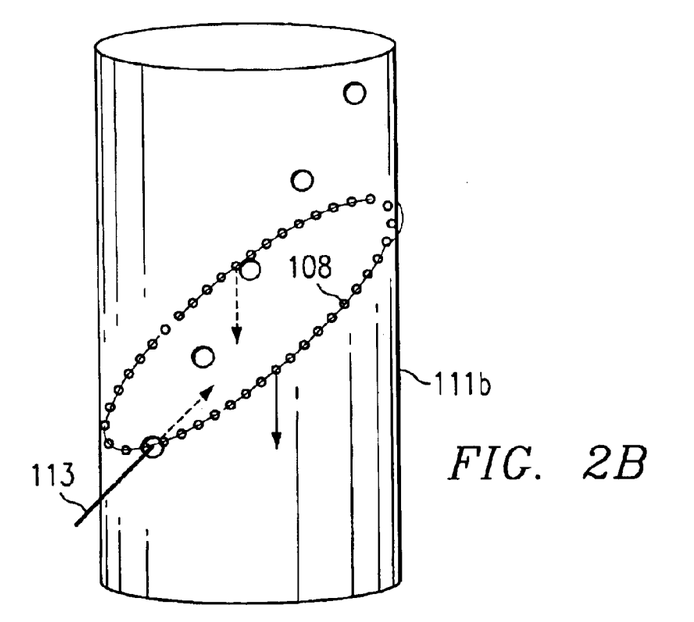
FIG. 2B shows the sensor loop positioned over a water inflow, and thus sensing the water inflow, during its downhole movement.

FIG. 2A illustrates a perspective view of the sensor loop 108 positioned against the inside of the casing 111*b* wall, the sensor loop 108 being adapted to move upward and downward over perforation holes 112 through the casing 111*b* towards an inflow of water 113 through a perforation hole 112. In an oil or gas well, water inflow is undesirable, therefore the location of the water inflow is important information to obtain so that the casing 111*b* can be repaired, for example. No inflow of water is measured in the sensor loop 108 position shown in FIG. 2A because there is no inflow of water 113 anywhere over the sensor loop 108. Preferably, the sensor loop 108 remains flush with the casing 111*b* or wellbore 111*a* interior wall, to maintain close proximity to regions of inflow of water 113, in order to directly sense the inflow of water 113. FIG. 2B shows the sensor loop 108 against the inside of the casing wall 111*b* moving downward and actually at the location of the inflow of water 113 through a perforation hole 112. In this position the sensor loop 108 detects the inflow of water 113.

An embodiment of the present logging tool 140, is adapted to measure the location and flow rate of a conductive fluid such as water entering or leaving a wellbore 111*a* or other flow conduit, such as a water pipeline or a chemical line or a sewer line. Sensor loop 108 is preferably mounted on a logging tool body 101 such that the sensor loop 108 is forced radially against the inside of the wellbore 111*a* or casing 111*b* wall. The sensor loop 108 is designed such that it lies approximately in a plane, the plane preferably being oriented at a non-perpendicular angle (e.g., ranging from 10 to 80 degrees, and more preferably, approximately 45 degrees) to the borehole central axis. When inserted into a borehole, the loop 108 may not lie completely in a plane due to it being compressed to fit within the borehole.

Figure 3:
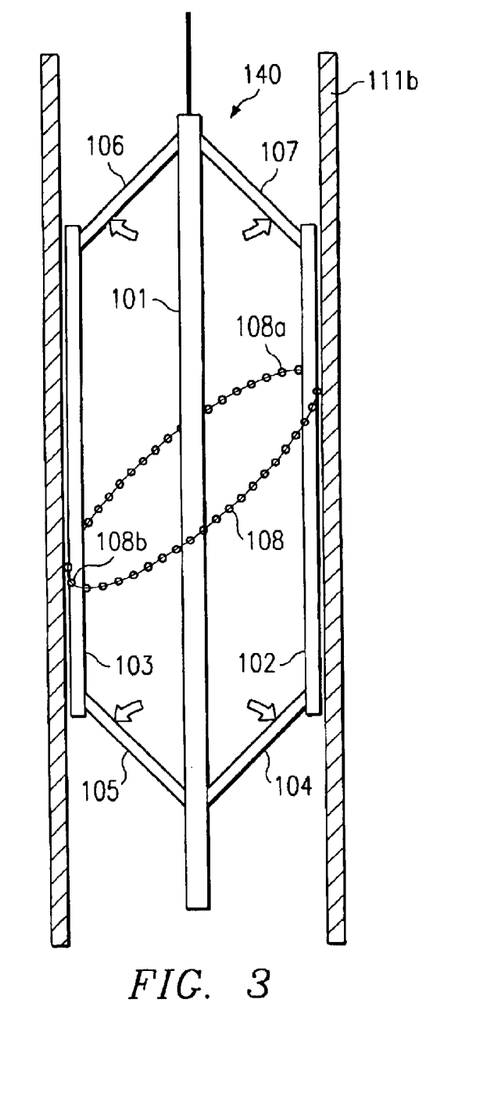
FIG. 3 shows a logging tool in a casing of a given inner diameter.
Figure 3A:
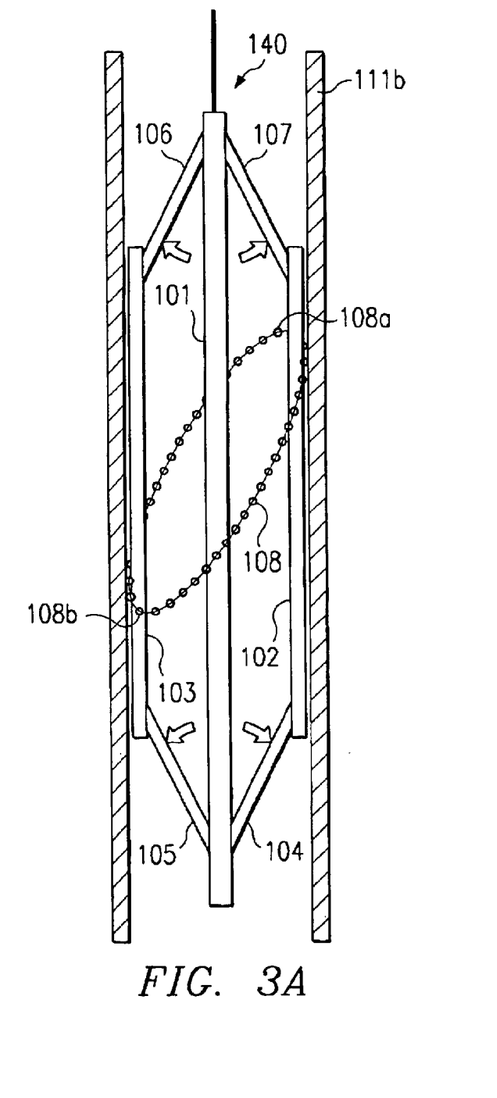
FIG. 3A shows the logging tool in the same well in a casing with an inner diameter smaller than that of FIG. 3.

FIGS. 3 and 3A depict the present logging tool 140 in use within different diameter casings 111*b*, which may be located within the same well, for example. The sloped force arms 104/105/106/107 allow the tool 140 to enter smaller diameter casings 111*b*, forcing the side arms 102/103 closer to the tool body 101. The tilt or angle of the sensor loop 108 with respect to the borehole central axis changes from one casing 111*b* inner diameter to another, as seen from FIG. 3 to FIG. 3A. The sensor loop 108 preferably is substantially close to lying within a single plane, but sensor loop 108 may not necessarily always lie exactly in a plane, depending upon the diameter of the casing 111*b*.

The top 108*a* and bottom 108*b* of the sensor loop 108 are held against the inner wall of the borehole 111*b*. A preferred method of holding the top 108*a* and bottom 108*b* of the sensor loop 108 against the inner. wall or casing 111*b* of the borehole is to mount the top 108*a* and bottom 108*b* of the sensor loop 108 on each of two side arms 102 and 103, respectively, as shown in FIGS. 3 and 3A. The side arms 102/103 are positioned substantially parallel to the main body 101 of the tool 140 and are pressed flat against the inner casing 111*b* wall. The two side arms 102/103 are forced against the casing 111*b* wall along their entire length, such as by force arms 104/105/106/107 which act as bow-spring centralizers at the end of each side arm 102/103. The remainder of the sensor loop 108 substantially everywhere on its circumference forces itself, by virtue of the elasticity of the sensor loop 108, to lie substantially flush against the inner wall of the casing 111*b*.

Figure 4:
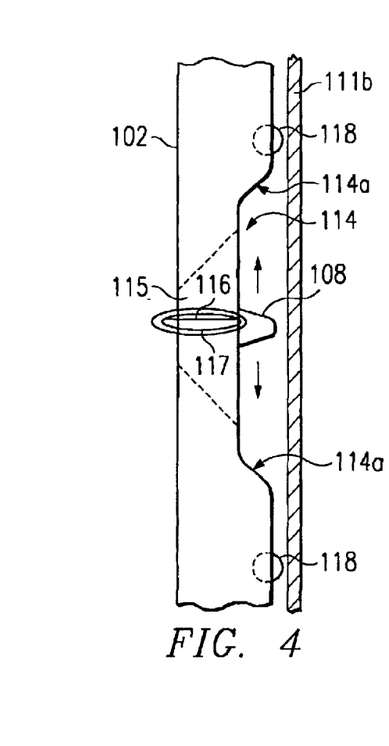
FIG. 4 depicts a side view of a side arm against the casing wall with the upper part of the sensor loop passing through a recess in the side arm.

FIG. 4 shows a side view of the mounting of the sensor loop 108 at each of the side arms 102/103 according to an embodiment of the present invention. The sensor loop 108 is preferably mounted to the side arm 102 in a recess 114 within the side arm 102. The recess 114 preferably has gently sloping ends at 114*a* to allow space for the thickness of the sensor loop 108 within the side arm 102 and to avoid the tool hanging up on any protrusion from the casing. The recess 114 with sloping ends 114*a* allows the side arm 102 to ride substantially flush to the casing inner wall 111*b*. A rolling mechanism 118 which may comprise, for example, ball rollers or other rolling mechanism, may be used to reduce wear on the side arm 102 and friction when the logging tool 140 moves along the casing inner wall 111*b*. Ball rollers 118 preferably comprise steel and may alternatively comprise titanium, as examples. Ball rollers 118 may be ¼ inch in diameter, for example.

The sensor loop 108 may be mounted to the side arm 102 with an alignment pin 116. Alignment pin 116 preferably comprises steel and may alternatively comprise titanium, as examples. Alignment pin 116 may be ¼ inch long and ⅛ inch in diameter, for example. Alignment pin 116 preferably is coupled to the sensor loop 108 and resides within a slot 115 in the side arm 102. Slot 115 may be 4 inches long, for example. The alignment pin 116 is adapted to maintain the plane of the sensor loop 108 relative to the logging tool 140 and is adapted to prevent the plane of the sensor loop 108 from rotating. The slot 115 in the side arm 102 preferably has sloped ends, as shown, to allow some tilt by the sensor loop 108 cross-section if needed to free the sensor loop 108 from a snag. A slide ring 117 may be disposed around the side arm 102 coupled to the sensor ring 108 and alignment pin 116, the slide ring 117 being adapted to maintain the sensor loop 108 substantially against the side arm 102 within recess side arm 114 but allowing the sensor loop 108 to move up or down along the side arm 102 within recess 114 as needed when entering a different inner diameter casing 111*b*. Slide ring 117 preferably comprises steel and may alternatively comprise titanium, as examples. Slide ring 117 may be ⅛ inch thick and ⅜ inch in diameter, for example.

Figure 4A:
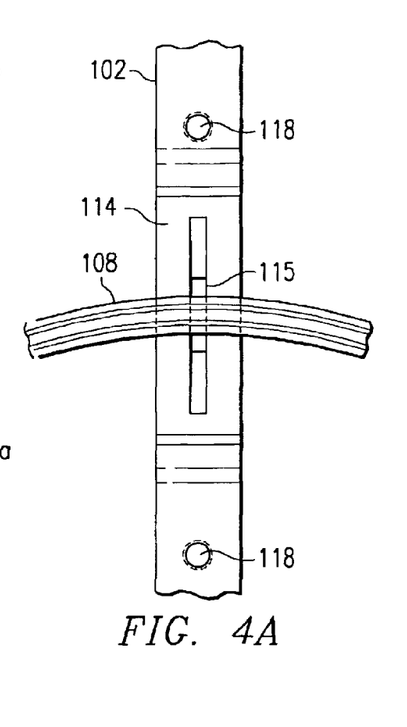
FIG. 4A shows a view of the same items of FIG. 3 from outside the casing looking radially inward.

FIG. 4A shows side arm 102 and the upper end of the sensor loop 108 from a view outside the casing 111*b* looking radially inward. The slot 115 in the side arm 102 for the alignment pin may be seen within side arm recess 114, as well as the roller balls 118 in the side arm 102.

Figure 4B:
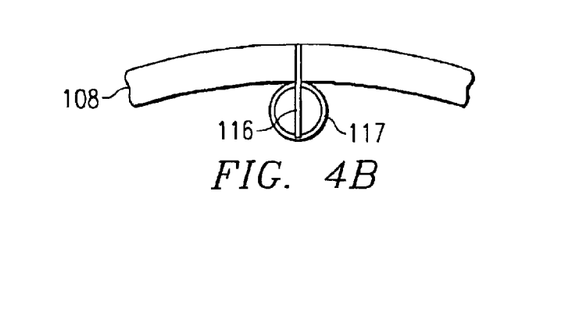
FIG. 4B shows a view from the end of the logging tool of part of the sensor loop and a mechanism for attaching the sensor loop to the side arm.

FIG. 4B shows a view of the sensor loop mounting mechanism from either end of the side arm 102. The alignment pin 116 coming out of the sensor loop 108 is shown with the slide ring 117. The side arm 102 may be substantially cylindrical in shape, but may also comprise other shapes.

Figure 4C:
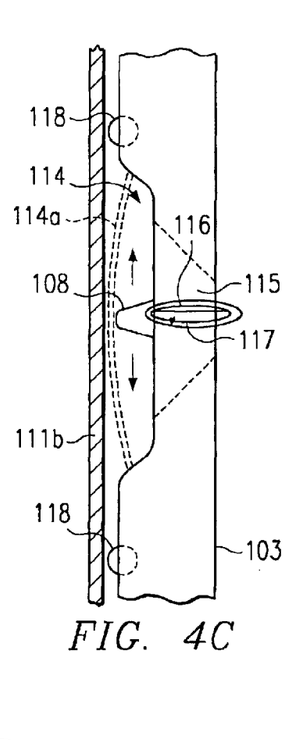
FIG. 4C shows the bottom of the sensor loop and the side arm.

FIG. 4C illustrates the mounting of the sensor loop 108 on the side arm 103, similar to FIG. 4, except FIG. 4C shows the other side arm 108. Again, the sensor loop 108 is mounted to the side arm in a recess 114 within the side arm 103. This mechanism allows the side arm 103 to ride substantially flush to the casing 111*b* inner wall. Ball rollers 118 or an alternative rolling mechanism may be used to reduce wear on the side arm 103 and friction when the logging tool 140 moves along the casing 111*b* inner wall. The sensor loop 108 is preferably mounted with an alignment pin 116 coupled to the sensor loop 108 and running out the sensor loop 108 and through a slot 115 in the side arm 103. The alignment pin 116 maintains the plane of the sensor loop relative to the logging tool and prevents the plane of the sensor loop from rotating. The slot 115 in the side arm 103 preferably has sloped ends as shown to allow some tilt by the sensor loop 108 cross section if needed to free the sensor loop 108 from a snag. The slide ring 117 maintains the sensor loop 108 substantially against the side arm 103 within recess 114 but allows the sensor loop 108 to move up or down along the side arm 103 within recess 114 as needed when entering a different inner diameter casing 111*b*. An optional shield 114*a*, comprising a fluoropolymer resin, and alternatively comprising nylon, for example, may be coupled to the side arm 103 to cover the recess 114 and prevent the sensor loop 108 from snagging on protrusions along the casing 111*b* wall.

Figure 4D:
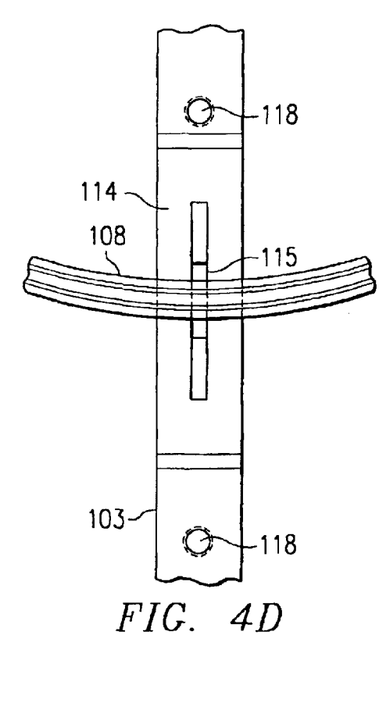
FIG. 4D shows the bottom of the sensor loop and the side arm with a radial view from outside the casing.

FIG. 4D shows side arm 103 and the lower end of the sensor loop 108 from a view outside the casing looking radially inward. The slot 115 in the side arm 103 for the alignment pin is visible within the recess 114. Roller balls 118 in the side arm 103 are also visible.

Figure 5:
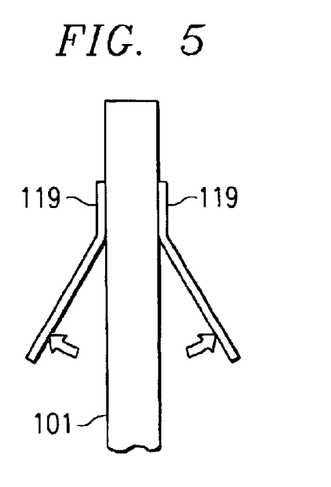
FIG. 5 shows the fixed ends of the force arms at the tool body.

FIG. 5 shows the fixed force arms 119 coupled to one end of the tool body 101. Preferably, the force arms 119 at one end of the logging tool 140 are fixed firmly to the tool body 101 to maintain the two side arms 102/103 and the tool body 101 in one plane. The force arms 119 provide an outward force to force the side arms 102/103 against the inner wall of the casing 111*b*. The outward force may be achieved from the elasticity of the metal force arms 119, or from spring loading or other mechanisms, for example.

Figure 5A:
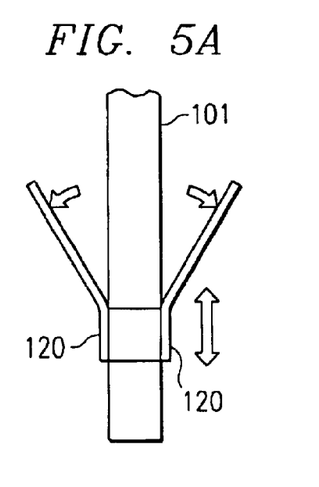
FIG. 5A shows the axially moving ends of the force arms at the tool body.

FIG. 5A illustrates the moving force arms 120 at the opposite end of the logging tool 140 from the fixed force arms 119 at the other end of the tool 140. Force arms 120 also push the side arms 102/103 outward and against the casing 111*b* inner wall. Preferably, by the geometry of the tool 140 design, the force arms 120 on at least one end of the tool 140 are adapted to move axially, e.g., along the axis of the wellbore within the borehole 111*a*, to allow for entry of the logging tool 140 into different inner diameter casings 111b. The moving force arms 120 may be coupled firmly to a thin flat plate or pin 121a that moves axially in a slot 121 through the tool body 101, for example (not shown). Alternatively, the force arms 120 may be fixed at both ends, moveable at both ends, or movable at the top and fixed at the bottom.

Figure 5B:
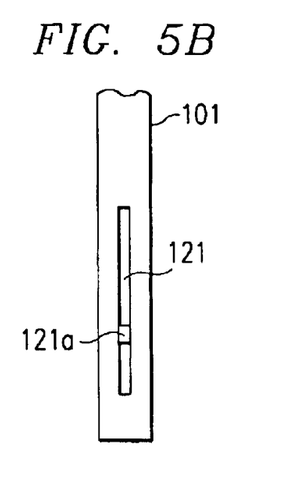
FIG. 5B shows the slot in the tool body in which the moving ends of the force arms move axially.

FIG. 5B shows a side view of the tool body 101 (oriented 90 degrees to the view of FIG. 5A). The slot 121 is shown that the plate or pin 121a coupled to the moving force arms 120 is adapted to move within. Pin 121a preferably comprises steel and may alternatively comprise titanium, as examples. Pin 121a may be ¾ inch long and ⅛ inch in diameter, for example.

Figure 5C:
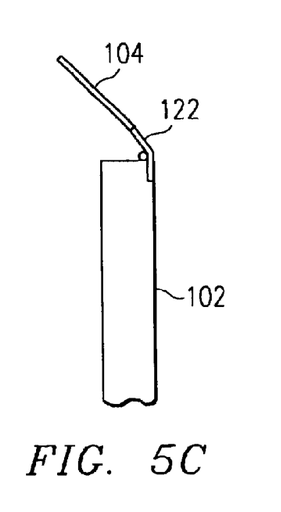
FIG. 5C shows the smooth hinge and junction of the force arms with the side arms.

FIG. 5C demonstrates a preferred method of connecting a force arm to a sidearm, in this case force arm 104 to side arm 102. Force arm 104 is connected to side arm 102 with a smooth hinge 122, such that no lip exists anywhere to hang up the tool 140 when the force arm 104 enters a smaller diameter casing 111b. Hinge 122 preferably comprises steel and may alternatively comprise titanium, as examples. Hinge 122 may be ½ inch in width and 4 inches in length, for example.

When the logging tool 140 enters a larger diameter casing 111b, such as going out of tubing and into larger diameter casing, the force arms 119 and 120 push the side arms 102/103 radially outward to contact the larger diameter borehole 111b. The moving end of the force arms 120 slides in its slot 121 towards the fixed end of the force arms 119. Similarly, when the tool 140 enters a smaller diameter portion of the wellbore 111b, the slope of the force arms 119 or 120 in contact with the end of the new diameter tubular 111b causes a radially inward force on the force arms 119 or 120 which compresses the force arms 119 or 120 radially towards the tool body 101. The moving force arms 120 move in slot 121 axially away from the fixed end force arms 119. Once in the new diameter casing 111b or borehole 111a, be it larger or smaller, the side arms 102/103 are forced by the force arms 119/120 to become substantially flush with the new borehole 111a or 111b wall.

Figure 5D:
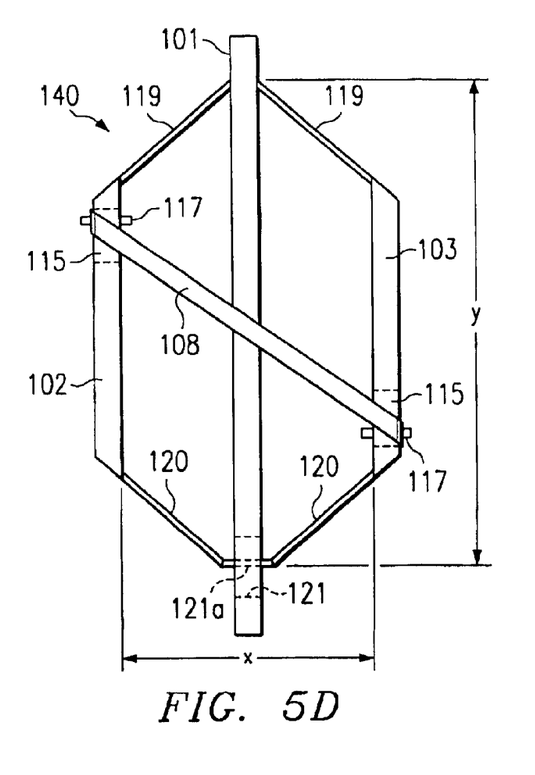
FIG. 5D illustrates a side view of mechanical elements of a logging tool.

FIG. 5D illustrates a cross-sectional view of the logging tool 140 with the sensor ring 108 coupled to the side arms by alignment pin 116 (not shown) and slide ring 117, within slot 115 in side arms 102/103. Side arms 102/103 are coupled to force arms 119, which force arms 119 are fixably coupled to tool body 101. At the other end of the tool 140, side arms 102/103 are coupled to force arms 120, which force arms 120 are moveably coupled to tool body 101 within tool body slot 121 by plate/pin 121a. As the tool 140 is moved to a portion of the borehole 111a having a smaller diameter, dimension x is decreased, while dimension y increases, and the angle of the sensor loop 108 to the central axis of the borehole 111a is decreased, accordingly.

Preferably, the force arms 119/120 at either end of the two side arms 102/103 are tapered towards the main body 101 of the tool 140 to allow the arms 102/103 to move radially in or out, in conformance with any changes in the inner diameter of the wellbore 111a or casing 111b. As the side arms move radially in or out to a wall with a different diameter, the side arms move the top and bottom of the sensor loop 108 in or out, also. The sensor loop 108 forces itself substantially everywhere against the inside of the wall 111a/111b with the new diameter. Thus, preferred embodiments of the present invention 140 may accommodate various wall 111a/111b diameters within one well.

Figure 6:
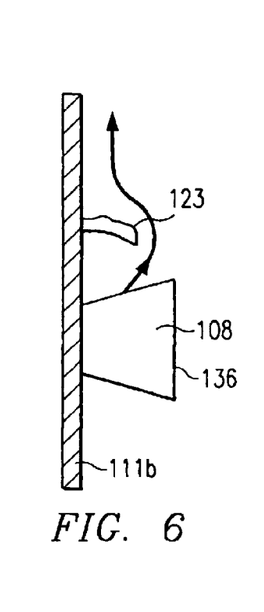
FIG. 6 depicts a side view of the sensor loop riding over a protrusion from the casing into the wellbore.

FIG. 6 demonstrates that the sensor loop body 136 cross-section may be sloped at an angle with respect to the casing wall 111b to enable the sensor loop 108 to ride over small protrusions 123 extending out of the casing wall 111a. This is advantageous because it will prevent the tool 140 from hanging up during logging.

Figure 7:
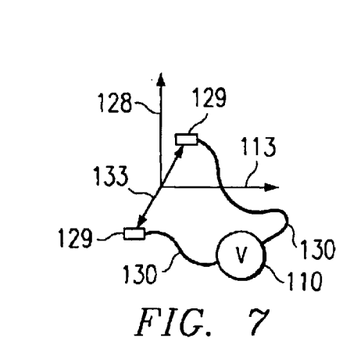
FIG. 7 shows water flow through a magnetic field producing an induced and measurable voltage.

FIG. 7 illustrates the water flow measurement physics principle implemented by the radial sensing device 108 of a preferred embodiment of the present invention, which is based upon Faraday's law of induced voltage. A magnetic field 128 substantially perpendicular to a flow 113 of water or other conductive liquid generates a voltage difference 133 perpendicular to both the magnetic field 128 and the water flow direction 113. This induced voltage 133 is detectable with a pair of electrodes 129 coupled by wires 130 to a measuring device 110 which may comprise a voltmeter, for example. Preferably an alternating magnetic field 128 is used which results in an alternating measured voltage 133. Using an alternating magnetic field 128 reduces the effects of electrode polarization and voltages resulting from complex electrochemical processes.

The electrodes 129 are positioned along the sensor loop 108, acting as sensors, with each pair of sensors comprising a small electromagnetic flowmeter. An electromagnetic flowmeter is a flow measurement method, the method comprising placing a magnetic field 128 at right angles to the flow 113 of a conductive fluid and then measuring the voltage 133 between the flowmeters. In a preferred embodiment of the present invention, the magnetic field 128 is at right angles to a casing 111a/111b diameter of the sensor loop 108 through the water inflow/outflow location. Water has the necessary conductivity to be measured, but oil and gas do not. Therefore, preferred embodiments of the present invention are insensitive to the flow of oil or gas, and sensitive only to the flow of water flowing radially inward or outward of the wellbore. Preferred embodiments of the present invention are not sensitive to the flow of water inside the wellbore along the axis of the borehole 111a/111b, whether that water is moving towards the top or the bottom of the well. When water flows through the magnetic field 128, a voltage 133 is induced perpendicular to the magnetic field 128 and perpendicular to the diameter along which the water enters the wellbore 111a/111b. Two electrodes 129 or sensors on either side of the water flow 113 detect this voltage 133. This induced voltage 133 is directly proportional to the water fluid 113 velocity, and reverses in sign if the water flow is out instead of in.

Figure 8:
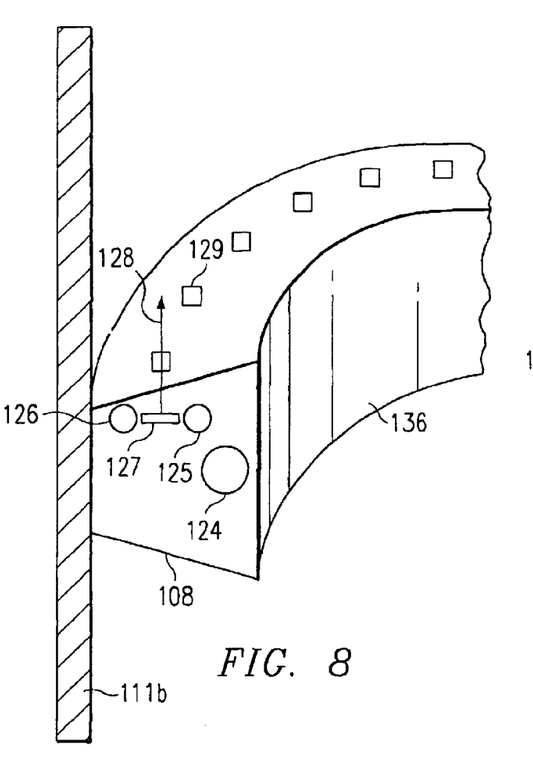
FIG. 8 shows a perspective view of the sensor loop and its various components.

FIG. 8 shows a preferred embodiment of the sensor loop 108 adapted to make a voltage measurement described herein. The sensor loop 108 is positioned substantially flush to the casing 111b. The sensor loop 108 comprises a sensor loop body 136. The sensor loop body 136 preferably comprises fluoropolymer resin and may alternatively comprise nylon, as examples. The sensor loop body 136 may be ¼ inch wide, ⅜ inch long, and 24 inches in diameter, for example.

The sensor loop body 136 preferably encloses two coils of wire 125 and 126, the coils 125/126 being adapted to carry current to induce a magnetic field 128. Coils 125/126 preferably comprise a copper alloy, and may alternatively comprise other conductive materials such as aluminum, as examples.

The magnetic field 128 is generated by a current run through the two coils 125/126 of wire in the sensor loop 108, each coil 125/126 running around the entire length of the sensor loop. The two coils 125/126 carry current in opposite directions so that the magnetic field from each coil 125/126 is in the same direction between the coils 125/126, and tends to cancel inside the inner coil 125 and outside the outer coil 126. A soft ferromagnetic material 127 is preferably positioned between the coils 125/126, the ferromagnetic material 127 adapted to increase the strength of the magnetic field 128 between coils 125/126. Ferromagnetic material 127 preferably comprise an iron alloy, and may alternatively comprise other magnetic materials such as nickel, as examples. The ferromagnetic material 127 may be 1/8 inch wide, for example.

Electrodes 129 are coupled along the exterior of the sensor loop body 136 and are adapted to detect a voltage difference between each adjacent pair of electrodes 129. Electrodes 129 preferably comprise a copper alloy, and may alternatively comprise other conductive materials such as aluminum, as examples. Electrodes 129 may be 1/8 inch wide and 1/8 inch long, for example.

The sensor loop 108 is spring-loaded, which feature is accomplished by the sensor loop 108 comprising a spring or force loop 124 being adapted to exert outward pressure to maintain contact of the sensor loop 108 substantially flush with the borehole interior wall while the tool traverses the borehole. Force loop 124 preferably comprises an elastic material, such as stainless steel spring wire, and may alternatively comprise bronze. The force loop 124 is preferably imbedded in the sensor loop body 136 to provide a mechanical force to press the sensor loop 108 substantially everywhere against the inside wall of the wellbore 111a or casing 111b regardless of the bore or casing interior diameter.

Figure 8A:
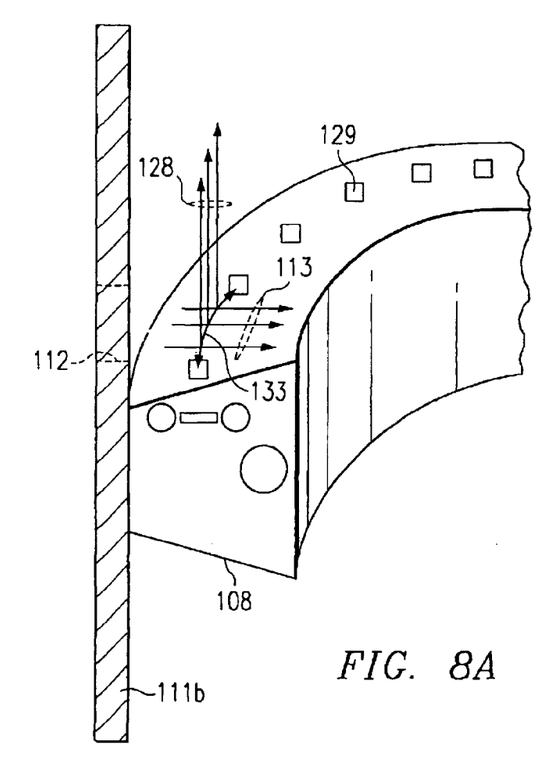
FIG. 8A shows a perspective view of how the water flow velocity measurement is made on one segment of the sensor loop.

The electrodes 129 are preferably spaced equidistant from one another, at regular spacings, with each spacing distance preferably being somewhat about or less than the diameter of a perforation hole 112 (shown in FIG. 8A). Electrodes 129 are contiguous to each other and ring the entire sensor loop 108 to cover the fill circumference of the sensor loop 108 and thus the full interior of the casing 111b wall. One electrode 129 can act as the right electrode for a pair of electrodes and also simultaneously act as the left electrode for the next adjacent pair, so that a series of substantially equally spaced electrodes. 129 exists at the surface of the sensor loop 108. These electrodes 129 are preferably coupled in series to each other with a high value resistor (shown in FIG. 9) between each. If the total voltage between one pair of electrodes 129 without an intervening resistor 132 is measured and recorded (e.g., by voltage meter 110, shown in FIG. 9), this voltage 133 is indicative of the fluid flow 113 rate (shown in FIG. 8a). Preferably the pair of electrodes 129 without an intervening resistor 132 are in close proximity to one another to minimize the amount of insensitive measuring length between them.

The measured voltage 133 is proportional to the equivalent flow velocity through one perforation hole 112 (shown in FIG. 8a). If the perforation hole 112 diameter is known (from known information about the type of charge that made it) or estimated (typically 0.3 inches in diameter, for example), the inflow or outflow rate at that depth within the well may also be determined.

In a preferred embodiment, the magnetic field 128 is alternating rather than constant to achieve optimum logging results. An alternating magnetic field minimizes electrode 129 polarization effects and also minimizes effects of voltages induced by complex chemical and other processes. Thus, an alternating electrical current may be applied to the coils to obtain an alternating magnetic field 128.

FIG. 8A shows the measurement of water flow 113 with the sensor loop 108 in accordance with an embodiment of the present invention. The magnetic field 128 is substantially perpendicular to water flow 113 moving into, or out of, the wellbore 111b. An induced signal voltage 133 is generated and detected by a pair of electrodes 129 if a conductive fluid such as water is flowing substantially radially inward or outward of the wellbore 111b. The sensor loop 108 is sensitive only to water flowing radially. Radial inflow is distinguished from radial outflow by the sign (e.g., +/−) of the signal voltage 133. Advantageously, the present sensor loop 108 is not sensitive to axial flow in the wellbore. Additionally, since the measurement principle requires some small amount of fluid conductivity as virtually all water has, oil and gas flows will not be detected as they are insulators and do not have the required minimum amount of conductivity. Thus the sensor loop 108 is sensitive only to the flow of conductive fluids such as water, and only to lateral conductive fluid that is entering or leaving the wellbore 111b. In contrast, prior art techniques are also sensitive to fluid movement inside the wellbore, and are sensitive to non-conductive fluid movement such as oil and gas.

Figure 9:
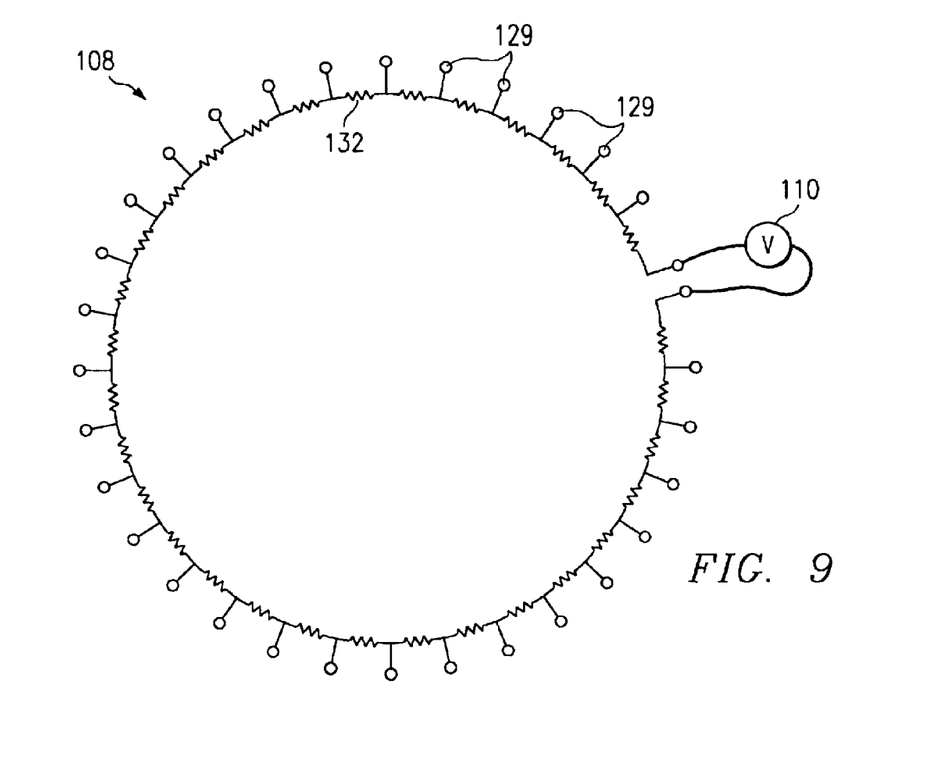
FIG. 9 shows a schematic of the flow-measuring electrical circuit of the sensor loop.

FIG. 9 shows a schematic of some electrical components within the sensor loop 108. The electrodes 129 are coupled to a resistor network. The electrodes 129 are coupled together with high resistance value resistors 132 such that measured voltage, measured by voltage measuring device 110, is proportional to the fluid flow 113 velocity, if the flow is passed over or between at least one pair of electrodes 129. Resistors 132 preferably range from 500,000 to 2,500,000 ohms and more preferably comprise 1,000,000 or 2,000,000 ohm resistors, as examples. The flow rate 113 is proportional to the measured voltage 133.

Figure 10A:
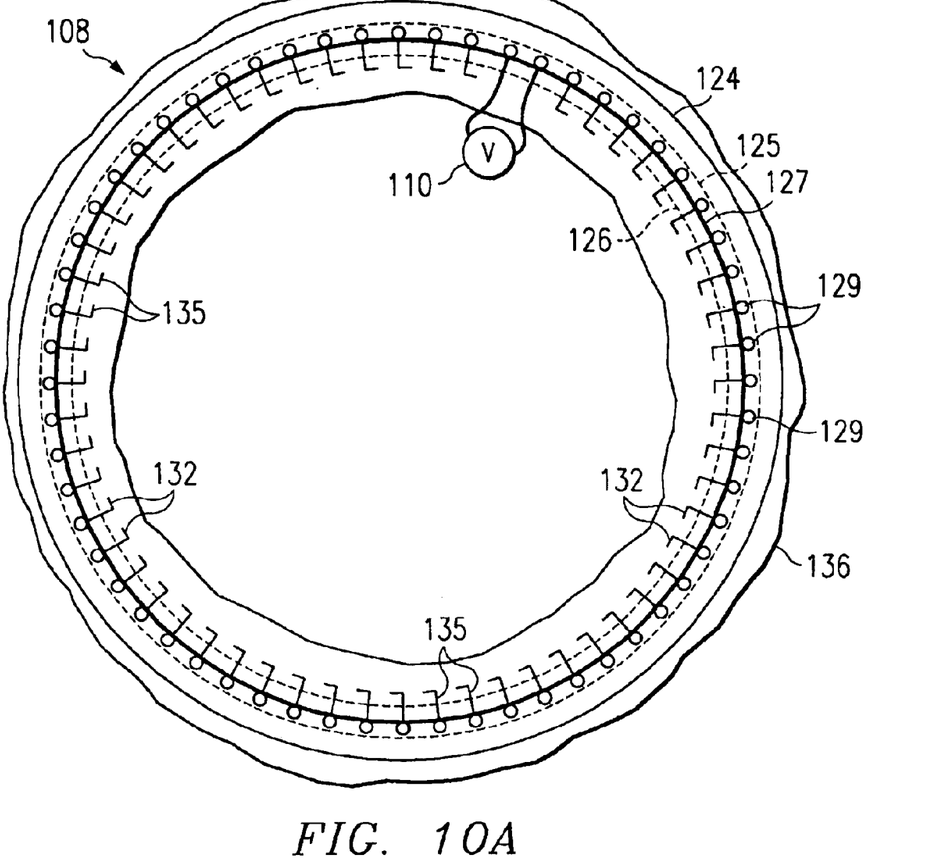
FIG. 10A illustrates a top view of the sensor loop.
Figure 10B:
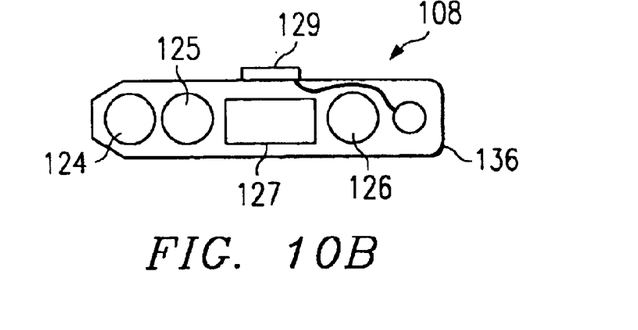
FIG. 10B shows a cross-sectional view of the sensor loop.

FIG. 10A illustrates a top view of the sensor loop 108, including a sensor loop body 136 which contains or is coupled to the sensor loop 108 elements described previously herein. FIG. 10B shows an example of a cross-sectional view of the sensor loop 108.

If the orientation of the inflow or outflow is desired, as would be useful in various applications, an alternative wiring and data sampling of the sensor loop 108 may be implemented, whereby each electrode 129 pair by itself is measured along with the azimuthal angle of the high side of the tool measurement. Thus, the orientation of the inflow or outflow may be determined.

Figure 11:
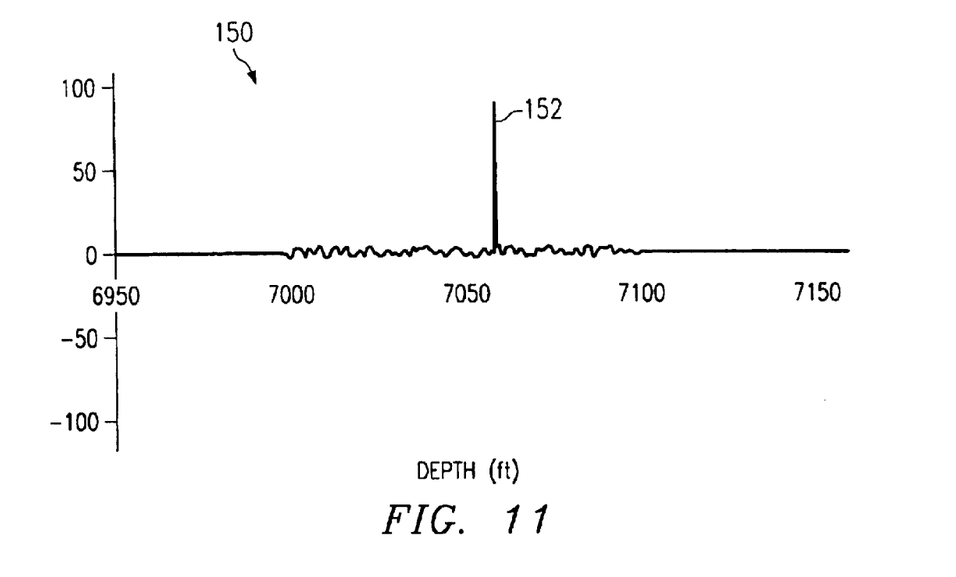
FIG. 11 shows an example of a log response chart.

FIG. 11 shows an example log 150 indicating the response of the present logging device described herein. On the log, the x-axis represents depth in feet, and the y-axis represents water flow rate in barrels of water per day. When preferred embodiments of the present invention are lowered into this wellbore over the interval 7000 to 7100 feet, a water inflow into the wellbore is detected at 7060 feet, shown at 152, in this example. No water inflow is detected except at 7060 feet, as evident from the logging graph 150.

While preferred embodiments of the invention are described with reference to oil and gas wells and water-injection wells, preferred embodiments of the present logging device are also useful in detecting leaks in water pipelines and other fluid pipelines, for example. Other alternative elements and features may be utilized with the present logging device. For example, an electromagnetic flow measurement in some other mode may be implemented, such as one pair of electrodes on a rotating arm to sweep around the casing inner wall. A different arrangement may be used to hold the sensor loop against the borehole wall, such as a telescoping loop, where the loop is perpendicular to the casing axis, adapted to flip down into place after going below the tubing. Another means of holding the sensor loop again the borehole wall may include a three or four point hold against the casing inner wall instead of the two point hold disclosed. Rather than making the water flow measurement directly against the borehole wall, the measurement may be made a predetermined distance away from the casing inner wall, e.g., ⅛" to ¾". The logging device design may be simplified to accommodate only one casing diameter, resulting in a simpler tool design. Rather than comprising a sensor loop as described herein, the radial sensing device 108 may alternatively comprise a plurality of small individual electromagnetic sensors (e.g. one electrode pair) used on each of a multiply-armed caliper tool, although the sensors may not cover the full borehole wall circumference in some cases. The preferred embodiments of the present invention are described herein for the measurement of the lateral inflow and outflow of water, however, preferred embodiments of the invention may also be utilized to measure the lateral flow of other conductive fluids. The various example dimensions described herein may vary according to a variety of factors such as how large the borehole is, and the inner diameter dimensions of the casings and tubing within the borehole.

The novel logging device embodiments disclosed herein achieve technical advantages by providing a logging device that is sensitive only to a conductive fluid such as water, and that is not sensitive to nonconductive fluids such as oil or gas. Only water entering or leaving the wellbore is sensed as it enters or leaves, and the sensor loop is not sensitive to water already in borehole, whether the water is moving or not. The device is not sensitive to the complex flow regimes in the center of the wellbore, because the device measures the flow as it enters the wellbore along the wall and before it enters into the complex flow regimes in the wellbore center. The device is not required to infer the cause of changes in above and below readings. The novel logging device directly senses water entering or leaving the wellbore. The device is not required to infer the type of fluid entered the borehole, as preferred embodiments of the invention are sensitive only to water. The measurement sensor loop has no moving sensor parts, as in some prior art logging instruments that comprise spinners, for example. The sensor loop has no threshold fluid velocity below which the measurement registers no flow, thus it will sense even a small flow.

While most prior art logging devices must be passed through the wellbore more than once, e.g., typically six sets of readings to obtain an accurate reading, preferred embodiments of the present invention may provide an accurate reading in only one pass, e.g., one set of readings. For example, the logging device 140 need only be inserted once into the borehole, and then removed, resulting in each portion of the borehole being measured for conductive fluid flow as little as once and being traversed only twice. Additionally, varying diameters of borehole may be accommodated with preferred embodiments of the present invention, with the use of the side arms that automatically adjust the angle of the sensor loop with respect to the borehole central axis.

While preferred embodiments of the invention have been described with reference to illustrative embodiments, this description is not intended to be construed in a limiting sense. Various modifications in combinations of the illustrative embodiments, as well as other embodiments of the invention, will be apparent to persons skilled in the art upon reference to the description. In addition, the order of process steps may be rearranged by one of ordinary skill in the art, yet still be within the scope of preferred embodiments of the present invention. It is therefore intended that the appended claims encompass any such modifications or embodiments. Moreover, the scope of the present application is not intended to be limited to the particular embodiments of the process, machine, manufacture, composition of matter, means, methods and steps described in the specification. Accordingly, the appended claims are intended to include within their scope such processes, machines, manufacture, compositions of matter, means, methods, or steps.

What is claimed is:

1. A fluid flow measuring device, comprising:
   a plurality of resistors disposed in a circular pattern;
   a plurality of electrodes, each electrode coupled between two adjacent resistors;
   a fist coil of wire adapted to generate a magnetic field wound proximate the resistors and electrodes;
   a second coil of wire adapted to generate a magnetic field wound proximate the resistors and electrodes; and
   a voltage measuring mechanism electrically coupled between two of the resistors, wherein a flow of conductive fluid is detectable by measuring the voltage.

2. The fluid flow measuring device according to claim 1, further comprising a ferromagnetic material disposed between the two coils.

3. The fluid flow measuring device according to claim 2, wherein the ferromagnetic material comprises an iron alloy.

4. The fluid flow measuring device according to claim 1, wherein at least the resistors and electrodes are mounted on a sensor loop, the sensor loop being spring-loaded and being adapted to exert outward pressure to maintain contact of the sensor loop substantially flush with a borehole interior wall.

5. The fluid flow measuring device according to claim 4, wherein the sensor loop comprises a body comprising fluoropolymer resin.

6. The fluid flow measuring device according to claim 4, wherein the sensor loop is spring-loaded with a stainless steel spring wire.

7. The fluid flow measuring device according to claim 4, wherein the sensor loop has a substantially oval shape.

8. The fluid flow measuring device according to claim 4, further comprising:
   means for maintaining flush contact of the sensor loop with a borehole interior wall over a range of borehole casing diameters.

9. The fluid flow measuring device according to claim 1, wherein the coils of wire comprise copper.

10. The fluid flow measuring device according to claim 1, wherein the plurality of resistors comprise values of between about 500,000 ohms and about 2,500,000 ohms.

11. The fluid flow measuring device according to claim 1, wherein at least the resistors and electrodes are mounted on a sensor loop, the sensor loop being spring-loaded to maintain contact of the sensor loop substantially flush with an interior wall of a fluid conduit.

12. The fluid flow measuring device according to claim 11, further comprising means for maintaining flush contact of the sensor loop with a fluid conduit interior wall over a range of conduit diameters.

13. A fluid flow measuring device, comprising:
   a series-coupled plurality of alternating electrodes and resistors, wherein the electrodes are disposed along a curved loop;
   a magnetic field source, the magnetic field source oriented to generate a magnetic field between adjacent electrodes, the magnetic field substantially orthogonal to an imaginary line intersecting adjacent electrodes; and a voltage measuring circuit electrically coupled to the plurality of alternating electrodes and resistors, the circuit coupled to measure a voltage difference between adjacent electrodes, the voltage difference representative of a radial flow of conductive fluid substantially orthogonal to both the imaginary line and the magnetic field.

14. The fluid flow measuring device according to claim 13, wherein the voltage difference is proportional to a velocity of the radial flow of conductive fluid.

15. The fluid flow measuring device according to claim 13, wherein the magnetic field source comprises a first coil of wire wound proximate the electrodes.

16. The fluid flow measuring device according to claim 15, wherein the magnetic field source further comprises a second coil of wire wound proximate the electrodes and offset from the first coil of wire.

17. The fluid flow measuring device according to claim 16, wherein the magnetic field source further comprises a ferromagnetic material disposed between the first coil of wire and the second coil of wire.

18. The fluid flow measuring device according to claim 13, wherein the curved loop has a substantially oval shape.

19. The fluid flow measuring device according to claim 13, wherein the curved loop is a closed loop.

20. The fluid flow measuring device according to claim 13, wherein adjacent electrodes are spaced about 0.3 inches or less from each other.

21. The fluid flow measuring device according to claim 13, wherein the electrodes are mounted on a sensor loop, the sensor loop comprising a force loop exerting outwardly directed radial force.

22. The fluid flow measuring device according to claim 13, wherein the resistors comprise values of between about 500,000 ohms and about 2,500,000 ohms.

23. A method of manufacturing a fluid flow measuring device, the method comprising:

disposing a plurality of electrodes spaced apart on a sensor loop;

disposing a plurality of resistors on the sensor loop;

electrically coupling the electrodes and resistors in alternating series;

disposing a magnetic field source on the sensor loop proximate the electrodes, wherein the magnetic field source is oriented to generate a magnetic field substantially orthogonal to an imaginary line intersecting adjacent electrodes; and electrically coupling a voltage measuring circuit to the plurality of alternating electrodes and resistors, the circuit coupled to measure a voltage difference between adjacent electrodes, the voltage difference representative of a radial flow of conductive fluid substantially orthogonal to both the imaginary line and the magnetic field.

24. The method of claim 23, wherein disposing the magnetic field source further comprises:

disposing a first coil of wire on the sensor loop proximate the electrodes; and disposing a second coil of wire on the sensor loop proximate the electrodes and offset from the first coil of wire.

25. The method of claim 24, wherein disposing the magnetic field source further comprises disposing a ferromagnetic material between the first coil of wire and the second coil of wire.

26. The method of claim 23, wherein the electrodes are positioned along the exterior of the sensor loop.

27. The method of claim 26, wherein the electrodes are disposed on a surface of the sensor loop.

28. The method of claim 23, wherein the resistors and the magnetic field source are disposed under a surface of the sensor loop.

29. The method of claim 23, wherein the electrically coupling of the electrodes and resistors is performed before the disposing of the plurality of electrodes and the disposing of the plurality of resistors.

30. The method of claim 23, wherein the electrodes are regularly spaced on the sensor loop.

31. The method of claim 30, wherein adjacent electrodes are spaced about 0.3 inches or less from each other.

32. The method of claim 23, further comprising disposing a force loop on the sensor loop, wherein the force loop exerts outwardly directed radial force.

33. The method of claim 23, wherein the sensor loop has a substantially oval shape.

* * * * *

UNITED STATES PATENT AND TRADEMARK OFFICE
CERTIFICATE OF CORRECTION

PATENT NO. : 6,779,407 B2
DATED : August 24, 2004
INVENTOR(S) : Maute

It is certified that error appears in the above-identified patent and that said Letters Patent is hereby corrected as shown below:

Title page,
Item [56], References Cited, FOREIGN PATENT DOCUMENTS, delete "WO 01/111190 A1" and replace with -- WO 01/11190 A1 --.

Column 5,
Line 33, delete "in borehole," and replace with -- in the borehole, --.

Column 7,
Line 5, delete "1111$b$" and replace with -- 111 $b$ --.

Column 11,
Line 6, delete "comprise" and replace with -- comprises --.

Column 12,
Line 66, delete "again" and replace with -- against --.

Column 13,
Line 28, delete "in borehole," and replace with -- in the borehole, --.

Column 14,
Line 14, delete "fist" and replace with -- first --.

Signed and Sealed this

Nineteenth Day of April, 2005

JON W. DUDAS
*Director of the United States Patent and Trademark Office*